No. 836,041. PATENTED NOV. 13, 1906.
W. R. JOHNSON.
PORTABLE SUSPENDING HOOK.
APPLICATION FILED NOV. 13, 1905.
2 SHEETS—SHEET 1.
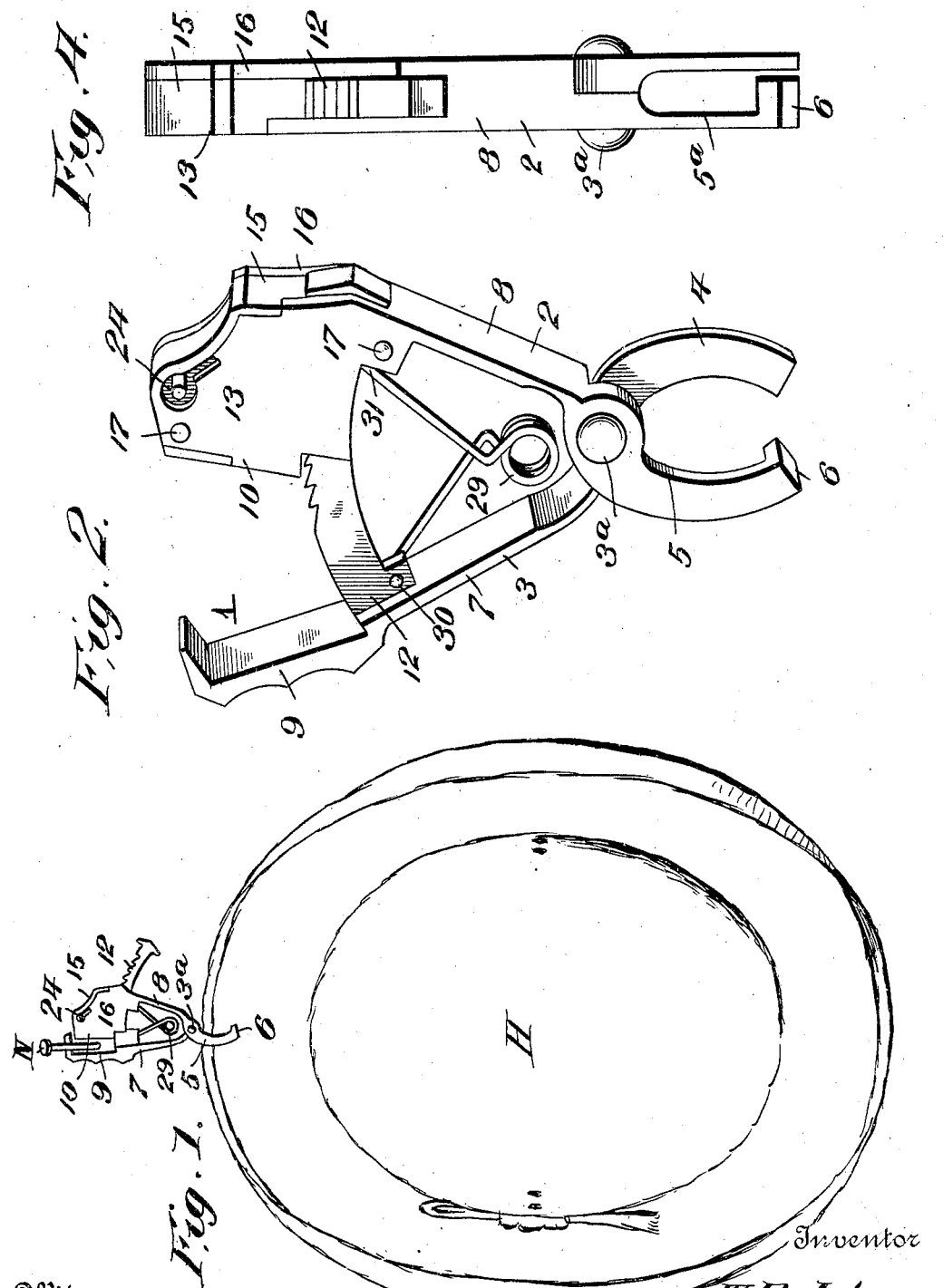

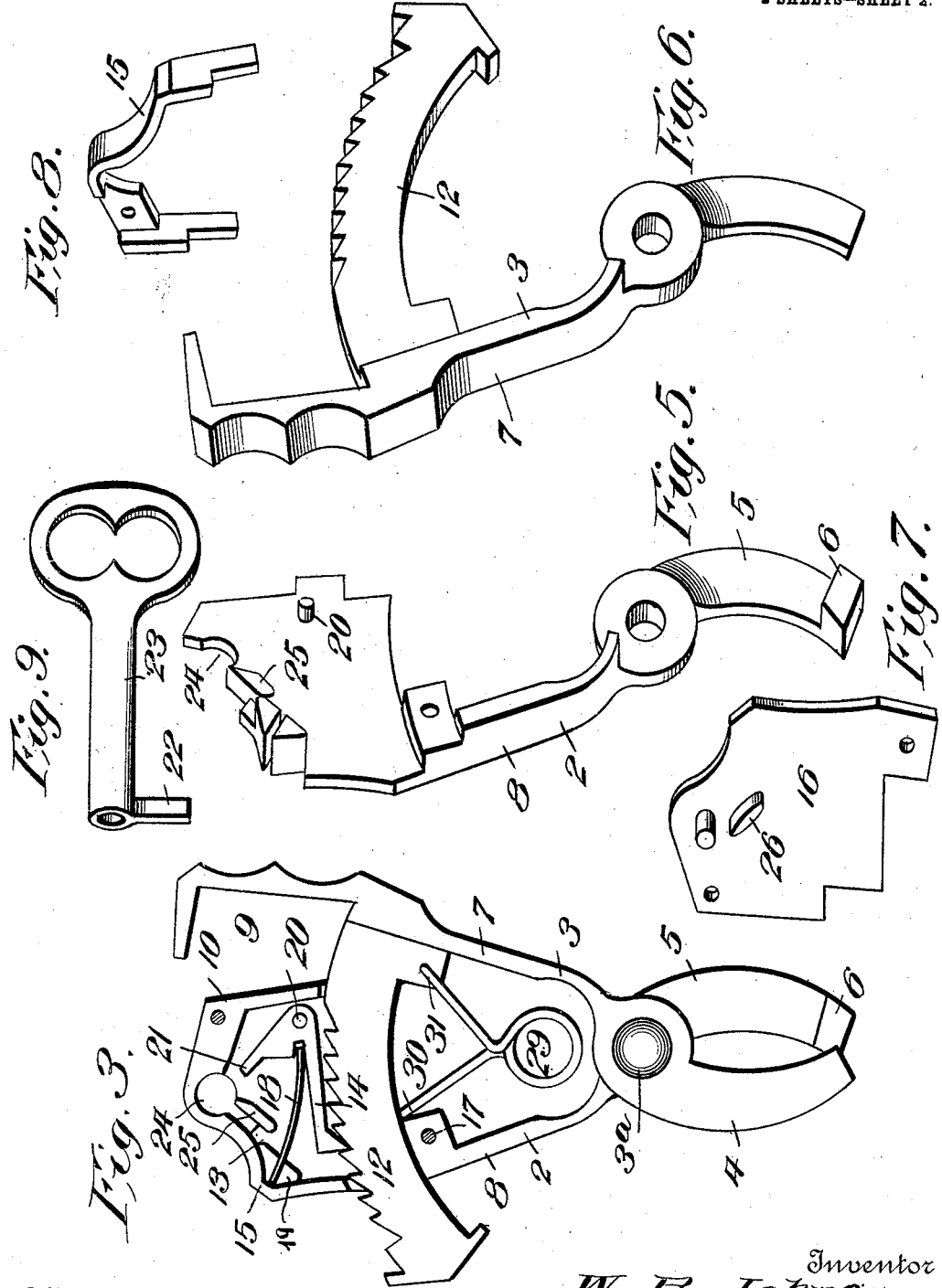

UNITED STATES PATENT OFFICE.

WILLIAM R. JOHNSON, OF EAST BOSTON, MASSACHUSETTS.

PORTABLE SUSPENDING-HOOK.

No. 836,041.

Specification of Letters Patent.

Patented Nov. 13, 1906.

Application filed November 13, 1905. Serial No. 287,099.

*To all whom it may concern:*

Be it known that I, WILLIAM R. JOHNSON, a citizen of the United States, residing at East Boston, in the county of Suffolk and State of Massachusetts, have invented certain new and useful Improvements in Portable Suspending-Hooks; and I do declare the following to be a full, clear, and exact description of the invention, such as will enable others skilled in the art to which it appertains to make and use the same.

My invention relates to improvements in portable suspending-hooks for securing hats, coats, umbrellas, or the like upon nails or the like in order to prevent theft of the articles.

The object of the invention is to provide a simple and efficient locking device of this character by means of which an article of personal use or any object may be securely locked upon a headed nail, hook, or similar support.

With the above and other objects in view my invention consists of certain novel features of construction, combination, and arrangement of parts hereinafter described and claimed.

In the accompanying drawings, Figure 1 is a view showing my improved locking device used for securing a hat upon a nail. Fig. 2 is a perspective view of the device in its open position. Fig. 3 is a sectional view showing the locking mechanism. Fig. 4 is an edge view of the device. Figs. 5 and 6 are perspective views of the two members or levers of the device. Fig. 7 is a perspective view of the cover-plate of the lock-casing. Fig. 8 is a similar view of the end plate of the same, and Fig. 9 is a perspective view of the key.

Referring to the drawings by numeral, 1 denotes my improved securing and locking device, which, as shown in Fig. 1, is adapted to secure or lock a hat H upon a headed nail N driven in a wall or the like. The device consists of two members or levers 2 3, which are crossed intermediate their ends and pivotally connected at their crossing by a rivet or the like 3ª. The short ends 4 5 of the levers have a slight longitudinal curvature and are adapted to form jaws which may be engaged with the article or object to be supported and locked. While these jaws 4 5 may be of any desired size, shape, and construction to adapt them to engage one or more articles or objects of any description, I preferably recess their inner faces, as at 5ª, to form a space between them and provide on the outer end of one of the jaws, preferably 5, an inwardly-extending projection or enlargement 6, which when the ends of the jaws are brought in transverse alinement is adapted to close or almost close the space between them.

The long ends or arms 7 8 of the levers 2 3 are provided with means for engaging a nail, hook, or other similar device and also with a locking means for securing the members or levers against movement to lock their ends 7 8 upon a nail N or the like and also their jaws 4 5 upon the hat H or any other article. As shown, the engagement of the ends 7 8 with the nail is effected by providing a recess or jaw 9 in the outer end of the arm 7 and providing a projection or jaw 10 upon the enlarged outer end of the arm 8, so that said projection or jaw 10 is adapted to enter the recess or jaw 9 and retain the nail or the like between them, as shown in Fig. 1.

By means of this construction it will be seen that the device may be locked upon a nail, hook, or the like of any size. While any suitable locking means may be provided, I preferably form or secure upon the inner face of the arm 7 a segmental-shaped rack-bar 12, which is adapted to move through an enlarged portion or casing 13 upon the arm 8 and to be locked therein by a dog or pawl 14. The lock-casing 13 preferably comprises an enlarged portion or plate formed integrally upon the outer end of the arm 8, an end plate 15, and a side or cover plate 16. These parts are secured by the engagement of interlocking tongues and recesses and by rivets 17, as shown. The dog or pawl 14 is in the form of a bell-crank and has one of its ends forced into engagement with the teeth of the rack-bar 12 by means of a flat spring 18. The latter bears against the inner face of said end of the bell-crank and has one of its ends secured within the casing, as at 19. The pawl or dog is pivoted at its angle, as shown at 20, and has its other end or arm 21 disposed so as to be actuated by the projection 22 on a tubular key 23. The latter is adapted to be inserted in a keyhole 24, formed in one side of the casing, as shown. Stops 25 26 are provided within the casing 13 in the path of the projection 22, so that when releasing the pawl from the rack the key must be first moved inwardly to its full extent, so that its projection 22 clears the stop-lug 25, then turned until it engages the stop-lug 26, then pulled outwardly to clear the latter lug and to bring the projection 22 into the path of the end 21 of the pawl 14, so that when the key is again turned said pawl will be disengaged from the rack-bar. In removing the key this operation is reversed. To facilitate the opening of the levers or members, I preferably provide between the inner portion of the arms 7 8 a coil-spring 29, which has its ends secured, as shown at 30 31, so as to force said arms apart as soon as the pawl is disengaged from the rack-bar.

The construction, use, and advantages of the invention will be readily understood from the foregoing description, taken in connection with the accompanying drawings. It will be seen that by means of the device an article or object of any description may be quickly and conveniently locked to any stationary object or support so as to prevent theft of the article or object thus secured or supported.

Various changes in the form, proportion, and the minor details of construction may be resorted to without departing from the principle or sacrificing any of the advantages of this invention.

Having thus described my invention, what I claim as new, and desire to secure by Letters Patent, is—

1. A locking device of the character described comprising a pair of levers crossed and pivoted intermediate their ends, article-engaging jaws at one end of said levers, and a lock-casing and a projection at the other end of one of said levers, said projection being adapted to enter a recess formed in the other of said levers to secure the device to a nail or the like, a segmental rack-bar carried by one of said levers and projecting through said lock-casing, and means in said casing for locking said rack-bar.

2. A locking device of the character described comprising a pair of levers crossed and pivoted intermediate their ends, article-engaging jaws at one end of said levers, and a lock-casing and a projection at the other end of one of said levers, said projection being adapted to enter a recess formed in the other of said levers to secure the device to a nail or the like, a segmental rack-bar carried by one of said levers and projecting through said lock-casing, a spring-actuated pawl in said lock-casing to engage said rack-bar, means for disengaging said pawl from said rack-bar, and a spring for forcing said levers apart when released by said pawl.

In testimony whereof I have hereunto set my hand in presence of two subscribing witnesses.

WILLIAM R. JOHNSON.

Witnesses:
 JOHN D. KAZAR,
 WILLIAM H. FLOWERS.